June 28, 1966     E. D. DITTO     3,257,879
CUTTING TOOL ADJUSTMENT ASSEMBLY
Filed June 18, 1964
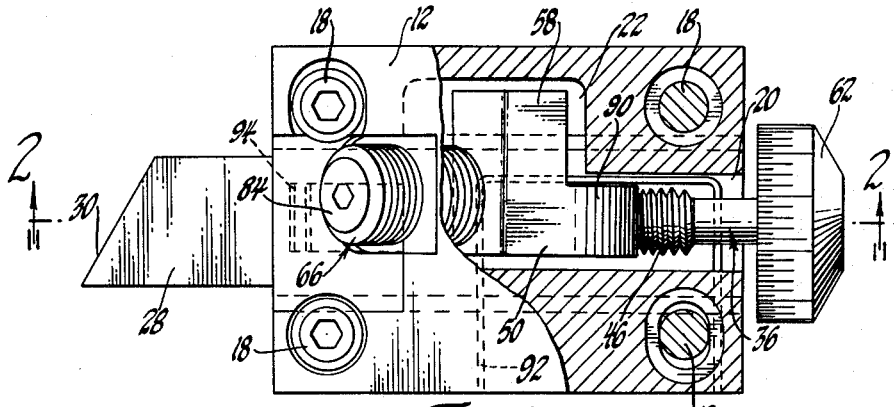
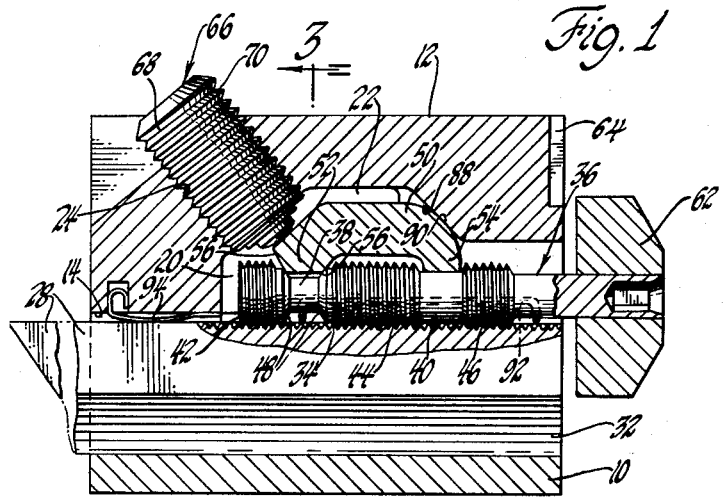
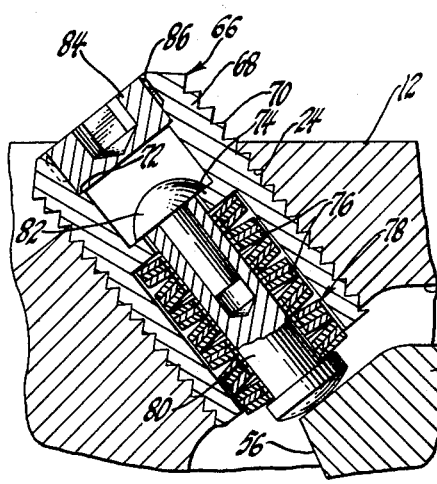
INVENTOR.
Edwin D. Ditto
BY
Robert L. Spencer
ATTORNEY

United States Patent Office

3,257,879
Patented June 28, 1966

3,257,879
CUTTING TOOL ADJUSTMENT ASSEMBLY
Edwin D. Ditto, Ann Arbor, Mich., assignor to General Motors Corporation, Detroit, Mich., a corporation of Delaware
Filed June 18, 1964, Ser. No. 376,146
4 Claims. (Cl. 82—36)

This invention relates generally to tool holders and more particularly to an improved cutting tool adjustment assembly and is directed to improvement on the device shown on my Patent 3,101,020 issued August 20, 1963.

This invention is particularly concerned with the provision of an adjustable cutting tool having no backlash and being capable of accurate mircometer adjustment wherein the cutting tool may be adjusted without the necessity of loosening clamping bolts prior to each adjustment and then tightening the clamping bolts after the adjustment prior to use of the cutting tool.

In the prior art, vertical, horizontal and transverse forces were used to hold the adjusting screw in contact with the cutting tool to assure accurate micrometer adjustment. Generally, screws were used to apply these forces to the adjusting screw. In some instances springs have been used to bias the adjusting screw in one or more of the aforementioned directions.

It is an object of the present invention to provide a single spring biasing means for bearing against a clamping block for holding an adjusting screw in full contact with the thread means provided on top of the cutting tool at all times.

Another object of this invention is to provide means to adjust the cutting tool wherein a constant force applied at one point to a clamping block secures a screw member in firm contact with the thread means of the cutting tool and prevents backlash of the adjusting means.

A further object of this invention is to provide a cam surface together with a single spring force for urging a clamping block to hold a screw member in firm contact with the thread means of a cutting tool thereby making accurate adjustment of the cutting tool possible without the necessity of loosening and tightening clamping bolts for each adjustment.

Another object of this invention is to provide an accurately adjustable cutting tool and tool holder in which thread means are provided on a surface of the cutting tool and an adjusting screw is held in full contact with such threads by means of a clamping block which is biased into engagement with the adjusting screw by a single spring force applying a torsional force to the clamping block for preventing backlash.

These and other objects and advantages of the present invention will become more apparent as reference is had to the following description and the accompanying drawings wherein:

FIGURE 1 is a top elevational view of the cutting tool assembly utilized in the present invention, with portions broken away to better illustrate the clamping block position in the tool holder.

FIGURE 2 is a sectional view taken substantially along the line 2—2 of FIGURE 1 for illustrating the relative position of the cutting tool, adjusting screw, clamping block, spring retainer means and spring biasing means.

FIGURE 3 is a view in the direction of the arrows taken substantially along the line 3—3 of FIGURE 2 and showing a sectional view of the tool holder, cutting tool, adjusting screw and clamping block.

FIGURE 4 is an enlarged view of a portion of FIGURE 2 with sections cut away for showing a sectional view of the Belleville washer spring assembly bearing against the clamping block.

For purposes of this description, the front of the assembly is considered to be the end from which the cutting edge of the tool protrudes and all similar parts of the assembly will have the same reference numerals.

Referring now to the drawings, as best seen in FIGURES 1 and 2, the cutting tool assembly comprises a housing consisting of a base plate 10 and a cover plate 12. A tool cavity 14 having a V-shaped base 16 is provided on the top surface of the base plate 10, as best seen in FIGURE 3.

The cover plate 12 rests on the top surface of the base plate 10 and is secured by a plurality of suitable fastening means such as bolt members 18. An adjusting screw cavity 20 and a clamping block cavity 22 are provided in the cover plate 12 and are aligned with the cutting tool cavity 14 in the assembled position.

A threaded spring assembly hole 24 extends downwardly and rearwardly at an inclined angle from the top surface of the cover plate 12 into the front top edge of the clamping block cavity 22. The spring assembly hole 24 is parallelly aligned with the adjusting screw cavity 20 but is off-set from the center line of the cavity.

A cutting tool 28 having a cutting edge 30 and a shank portion 32 is slidably mounted on the V-shaped base 16 of the cutting tool cavity 14. Thread means 34 are provided on top of the shank portion 32 and extend substantially the entire length thereof. An adjusting screw 36 extends within the cavity 20 and is rotatably supported on the thread means 34. The inwardly extending end portion of the adjusting screw 36 is provided with peripheral grooves 38 and 40 which separate threaded portions 42, 44 and 46. As can best be seen in FIGURES 2 and 3, the thread portions 42, 44 and 46 are rotatably supported on the thread means 34 of the cutting tool 28. The front peripheral groove 38 is provided with tapered side surfaces 48.

A clamping block 50 is positioned in the clamping block cavity 22 and is provided with a pair of spaced downwardly extending leg portions 52 and 54. The front leg 52 is adapted for engagement with the peripheral groove 38 and is provided with tapered side surfaces 56 which are slidably engageable with the tapered side surfaces 48 of the groove 38 on the adjusting screw 36. The rear leg 54 is adapted for engagement with the rear groove 40 of the adjusting screw 36. Sufficient clearance is provided between the legs 52 and 54 of the clamping block 50 to accommodate the threaded portion 44 of the adjusting screw. As can best be seen in FIGURES 1 and 3, the clamping block 50 has an arm portion 58 which extends at right angles from the main body of the clamping block. A foot portion 60 of the arm 58 is designed to rest on the base 10 adjacent the tool cavity 14. A micrometer adjusting knob 62 is secured to the back end of the adjusting screw 36 and is cooperable with the indicia 64 for indicating accurate adjustment of the cutting tool.

As best seen in FIGURES 2 and 4, a spring assembly or energy cartridge 66 is threadably mounted in the threaded spring assembly hole 24. The spring assembly 66 consists of a tubular case 68 having a threaded exterior 70 for cooperating with a threaded spring assembly hole 24 whereby the spring assembly may be moved into and from contact with the clamping block 50 by rotation thereof.

Referring now to FIGURE 4, the interior of case 68 has a shoulder 72 and an arm 74 extending inwardly toward the center of the tube. A plurality of Belleville washers 76 in stacked relationship form a Belleville spring 78 which is positioned in the one end of the tubular case 68 about a pin 80 and bearing against one side of arm 74. A drive screw or groove pin 82 is driven into an aperture in the end of pin 80 by passing it through the other end of the tubular case 68 in such a manner that it contacts the other side of arm 74 and thus secures the spring 78 in position. To complete the spring assembly 66, a special Allen nut 84, having a serrated edge portion 86, is driven into the other end of the case 68 until it contacts shoulder 72. Thus, it can be seen that the energy cartridge 66 may be screwed into and out of the threaded spring assembly hole 24 by placing an Allen wrench in the Allen nut and rotating the assembly.

Referring now to FIGURE 2, when the energy cartridge 66 is screwed into contact with the clamping block 50, the Belleville washer spring 78 is compressed and an angular force is exerted upon the clamping block which produces resultant forces urging the block downwardly and rearwardly in its cavity into contact with the adjusting screw. The rear wall 88 of the clamping block cavity is sloped to coact with the rear surface 90 of the clamping block in such a manner that the rearward force component exerted on the block 50 by the energy cartridge is converted to a vertical force acting downwardly through the rear leg 54 to hold the back of the adjusting screw 36 in contact with the thread portion 34 of the cutting tool 28. The vertical force component of the energy cartridge is transmitted through the front leg 52 to force the front part of the adjusting screw 36 into contact with the thread portion 34 of the cutting tool. Since the center line of the spring assembly hole 24 is off-set but parallel to the center line of the adjusting screw 36, a portion of the vertical force component is applied through the clamping block to the foot 60 bearing against the base 10 and the remainder of the vertical force component is applied through the front leg 52 to the front groove 38 of the adjusting screw 36. The off center application of the vertical force component provides a torsional biasing which prevents backlash during adjustment of the adjusting screw 36.

A retainer spring 92 is slip fit into appropriate holes in the cover block in such a manner that it will retain the adjusting screw 36 and clamping block 50 in their respective positions during assembly and disassembly of the unit. A leaf spring 94 is positioned at the forward end of the cover block so that a cutting tool 28 will be retained in the unit prior to the spring assembly 66 being screwed into biasing engagement with the clamping block 50.

In operation, the cutting tool 28 may be slidably adjustably positioned by the reaction between the thread means or nut segments 34 of the cutting tool 28 and the threaded portions 42, 44, 46 of the adjusting screw 36 as the adjusting screw is rotated by means of the micrometer adjusting knob 62. In prior apparatus, before the cutting tool could be adjusted it was necessary to loosen the clamping screws which, acting through the clamping block, held the adjusting screw 36 in rigid contact with the thread mans 34 provided on top of the cutting tool shank. It was also necessary after each adjustment to retighten the clamping screws to secure the adjusting means to the cutting tool and hold the tool in the adjusted position. In the present invention, the energy cartridge 66 exerts a constant force on the clamping block 50 thereby maintaining the threads of the adjusting screw fully engaged with the threads of the nut segment 34 on the top of the cutting tool shank. With the threaded screw assembly hole 24 parallelly aligned with the adjusting screw cavity center line but being off-set therefrom, the biasing force generated by the energy cartridge 66 when it contacts the clamping block at an angle (as seen in FIGURE 2) produces a force having a vertical component and a horizontal component. The horizontal component force urges the clamping block to the rear of the clamping block cavity where the cam surface 90 of the clamping block cooperates with the sloped surface 88 of the clamping block cavity for directing the rearward force into a downward force acting through the leg 54 to bias the adjusting screws downwardly into the nut segment of the cutting tool. The vertical component force exerts a downward pressure on the clamping block which acts through the front leg 52 for biasing the front of the adjusting screw into the nut segment 34 of the cutting tool and also acts through the foot 60 against the base plate 10. Since the application of vertical pressure by the energy cartridge 66 is applied at a distance from the center line of the adjusting screw, a static torsional force prevents backlash of the adjusting screw after the desired adjustment has been made. The force of the biasing means may be varied by adjusting the energy cartridge into and out of the spring assembly hole by means of an Allen wrench cooperating with the Allen nut on the one end of the energy cartridge. When the energy cartridge has been adjusted to maintain the desired pressure on the adjusting screw, the cutting tool may be accurately adjusted with reference to the calibrated knob and the indicia as needed without the additional steps of loosening and retightening clamping means for each adjustment.

While the invention is susceptible to variations of details of construction and arrangement of parts it should be understood that there is no intention to necessarily limit the invention to the specific details disclosed but only to be limited to the spirit and scope of the appended claims.

I claim:

1. A tool block and assembly comprising a base plate, a cutting tool cavity in said base plate, a cover plate, an adjusting screw cavity in said cover plate aligned with said cutting tool cavity, a clamping block cavity in said cover plate having one portion thereof aligned with said adjusting screw cavity and said cutting tool cavity, a second portion of said clamping block cavity extending above said base plate at substantially a right angle to the center line of said cutting tool cavity and said adjusting screw cavity, a cutting tool slidably supported in said cutting tool cavity, thread means on said cutting tool extending substantially the entire length thereof adjacent said adjusting screw cavity, an adjusting screw being rotatably supported on said thread means for cooperation therewith and extending into said adjusting screw cavity, a pair of circumferential grooves on said adjusting screw dividing the threads of said screw into three portions, a clamping block in said clamping block cavity having a pair of legs and a foot portion for supporting said clamping block in the circumferential grooves on said adjusting screw and on said base plate, respectively, and spring biasing means for biasing said clamping block against one side of said clamping block cavity and into engagement with said adjusting screw and said base plate.

2. A tool block and assembly comprising a base plate, a cutting tool cavity in said base plate, a cover plate, an adjusting screw cavity in said cover plate aligned with said cutting tool cavity, a clamping block cavity in said cover plate having one portion thereof aligned with said adjusting screw cavity and said cutting tool cavity, a second portion of said clamping block cavity extending above said base plate at substantially a right angle to the center line of said cutting tool cavity and said adjusting screw cavity, a cutting tool slidably supported in said cutting tool cavity, thread means on said cutting tool extending substantially the entire length thereof adjacent said adjusting screw cavity, an adjusting screw being rotatably supported on said thread means for cooperation therewith and extending into said adjusting screw cavity, a pair of circumferential grooves on said adjusting screw dividing the threads of said screw into three portions, a clamping block in said clamping block cavity having a pair of legs and a foot portion for supporting said clamping block in the circumferential grooves on said adjusting screw and on said base plate, respectively, a threaded spring assembly aperture extending through said cover plate to said clamping block cavity, and adjustable spring biasing means threadably mounted in said spring assembly hole for biasing said clamping block against one side of said clamping block cavity and into engagement with said adjusting screw and said base plate.

3. A tool block and assembly comprising a base plate, a cutting tool cavity in said base plate, a cover plate, an adjusting screw cavity in said cover plate aligned with said cutting tool cavity, a clamping block cavity in said cover plate having one portion thereof aligned with said adjusting screw cavity and said cutting tool cavity, a second portion of said clamping block cavity extending above said base plate at substantially a right angle to the center line of said cutting tool cavity and said adjusting screw cavity, a cutting tool slidably supported in said cutting tool cavity and extending from the front of said tool block, thread means on said cutting tool extending substantially the entire length thereof adjacent said adjusting screw cavity, an adjusting screw being rotatably supported on said thread means for cooperation therewith and extending into said adjusting screw cavity, a pair of circumferential grooves on said adjusting screw dividing the threads of said screw into three portions, a clamping block in said clamping block cavity having a main portion aligned with said adjusting screw, an arm extending at substantially a right angle to said main portion, a foot portion on said arm for contacting said base plate, a pair of legs on said main portion for cooperating with said pair of circumferential grooves for bearing on said adjusting screw, a threaded spring assembly aperture extending through said cover plate to the front of said clamping block cavity, and adjustable spring biasing means threadably mounted in said spring assembly hole for biasing said clamping block rearwardly against the back of said clamping block cavity and downwardly into engagement with said adjusting screw and said base plate, whereby the threads of the adjusting screw are biased into the thread means of said cutting tool.

4. A tool block and assembly comprising a base plate, a cutting tool cavity extending longitudinally in said base plate, a cover plate, an adjusting screw cavity in said cover plate aligned with said cutting tool cavity, a clamping block cavity in said cover plate having one portion thereof aligned with said adjusting screw cavity and said cutting tool cavity, a second portion of said clamping block cavity extending above said base plate at substantially a right angle to the center line of said cutting tool cavity and said adjusting screw cavity, a cutting tool slidably supported in said cutting tool cavity and extending from the front of said tool block, a threaded nut segment on said cutting tool extending substantially the entire length thereof adjacent said adjusting screw cavity, an adjusting screw being rotatably supported on said nut segment for cooperation therewith and extending into said adjusting screw cavity, means for rotating said adjusting screw whereby said cutting tool is moved longitudinally in said cutting tool cavity, a pair of circumferential grooves on said adjusting screw dividing the threads of said screw into three portions, a clamping block in said clamping block cavity having a main portion aligned with said adjusting screw, an arm extending at substantially a right angle to said main portion, a foot portion on said arm for contacting said base plate, a pair of legs on said main portion for cooperating with said pair of circumferential grooves for bearing on said adjusting screw, a threaded spring assembly aperture extending through said cover plate to the front of said clamping block cavity, and adjustable spring biasing means threadably mounted in said spring assembly hole for biasing said clamping block rearwardly against the back of said clamping block cavity and downwardly into engagement with said adjusting screw and said base plate, whereby the threads of the adjusting screw are biased into the nut segment of said cutting tool for preventing movement of said cutting tool other than by movement of the adjusting screw.

References Cited by the Examiner

UNITED STATES PATENTS 3,207,015   9/1965   Ditto _____ 82—36

WILLIAM W. DYER, Jr., *Primary Examiner.*

LEONIDAS VLACHOS, *Examiner.*